US012795195B2

(12) United States Patent
Agnihotri

(10) Patent No.: US 12,795,195 B2
(45) Date of Patent: Nov. 10, 2026

(54) HLS-BASED ATSC 3.0 PLAYBACK USING MMTP DATA

(71) Applicant: Sony Group Corporation, Tokyo (JP)

(72) Inventor: Tanmay Agnihotri, San Diego, CA (US)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 18/910,547

(22) Filed: Oct. 9, 2024

(65) Prior Publication Data

US 2026/0101086 A1 Apr. 9, 2026

(51) Int. Cl.
*H04N 21/435* (2011.01)

(52) U.S. Cl.
CPC ................................ *H04N 21/435* (2013.01)

(58) Field of Classification Search
None
See application file for complete search history.

(56) References Cited

U.S. PATENT DOCUMENTS 6,005,938 A 12/1999 Banker et al.
6,373,904 B1 4/2002 Sakamoto et al.
6,393,562 B1 5/2002 Maillard
6,584,199 B1 6/2003 Kim et al.
6,920,222 B1 7/2005 Tsukahara et al.
8,401,191 B2 3/2013 Chen et al.
8,671,422 B2 3/2014 Foti
9,002,006 B2 4/2015 Chen et al.
11,044,294 B2 6/2021 Agnihotri et al.
11,606,528 B2 3/2023 Agnihotri
2003/0073402 A1 4/2003 Herring et al.
2003/0172376 A1 9/2003 Coffin
2005/0198680 A1 9/2005 Baran et al.
2006/0004661 A1 1/2006 Bacon
2006/0053442 A1 3/2006 Ridderheim et al.
2007/0098165 A1 5/2007 Yoshikawa
2008/0168133 A1 7/2008 Osborne
2009/0136203 A1 5/2009 Stam et al.
2009/0296535 A1 12/2009 Jones et al.
2011/0142139 A1 6/2011 Cheng et al.
2012/0167133 A1 6/2012 Carroll et al.
2012/0192220 A1 7/2012 Wyatt et al.
2012/0307654 A1 12/2012 Pantos et al.

(Continued)

FOREIGN PATENT DOCUMENTS

CN 103020297 B 4/2013
CN 111901694 B 11/2020

(Continued)

OTHER PUBLICATIONS

U.S. Appl. No. 16/214,933, filed Dec. 10, 2018, Paul Joseph Hearty.

(Continued)

*Primary Examiner* — Heather R Jones

(74) *Attorney, Agent, or Firm* — John M. Rogitz; John L. Rogitz

(57) ABSTRACT

Moving Picture Experts Group (MPEG) media transport protocol (MMTP) data indicating fragmented MP4 media content is received from a source of content such as an ATSC 3.0 source. The MMTP data is used to create HTTP Live Streaming (HLS) files, and the receiving HLS media player then plays the associated media content using the HLS files.

20 Claims, 9 Drawing Sheets

(56) References Cited

U.S. PATENT DOCUMENTS

| | | | | |
|---|---|---|---|---|
| 2013/0007799 | A1 | 1/2013 | Sandoval | |
| 2013/0326553 | A1 | 12/2013 | Nicolas | |
| 2013/0332976 | A1 | 12/2013 | Shenker et al. | |
| 2014/0280784 | A1* | 9/2014 | Moroney | H04L 65/1069 709/219 |
| 2014/0325572 | A1 | 10/2014 | Yie et al. | |
| 2015/0100996 | A1 | 4/2015 | Freeman et al. | |
| 2015/0195327 | A1 | 7/2015 | Bouazizi et al. | |
| 2015/0281770 | A1 | 10/2015 | Lim et al. | |
| 2015/0281799 | A1 | 10/2015 | Lim | |
| 2016/0234348 | A1 | 8/2016 | Mao et al. | |
| 2016/0234355 | A1 | 8/2016 | Lee et al. | |
| 2016/0234682 | A1 | 8/2016 | Mandyam | |
| 2016/0360288 | A1 | 12/2016 | Mandyam et al. | |
| 2016/0366479 | A1 | 12/2016 | Crowe et al. | |
| 2016/0373489 | A1 | 12/2016 | Lee et al. | |
| 2017/0054520 | A1 | 2/2017 | Kwak et al. | |
| 2017/0070789 | A1 | 3/2017 | Liassides et al. | |
| 2017/0134763 | A1 | 5/2017 | Hwang et al. | |
| 2017/0302982 | A1 | 10/2017 | Simpson et al. | |
| 2017/0374429 | A1 | 12/2017 | Yang | |
| 2018/0184136 | A1 | 6/2018 | Oh et al. | |
| 2018/0205975 | A1 | 7/2018 | Oh et al. | |
| 2018/0288468 | A1 | 10/2018 | Yamagishi et al. | |
| 2018/0373847 | A1 | 12/2018 | Lo et al. | |
| 2019/0058909 | A1 | 2/2019 | Eyer et al. | |
| 2019/0058929 | A1 | 2/2019 | Young et al. | |
| 2019/0174156 | A1 | 6/2019 | Crawford et al. | |
| 2019/0207998 | A1* | 7/2019 | Agnihotri | H04N 21/8456 |
| 2019/0215575 | A1 | 7/2019 | Yang et al. | |
| 2019/0246148 | A1 | 8/2019 | Oh et al. | |
| 2019/0356944 | A1 | 11/2019 | Patel et al. | |
| 2020/0007922 | A1 | 1/2020 | Yun | |

FOREIGN PATENT DOCUMENTS

| | | | | |
|---|---|---|---|---|
| WO | 2016140479 | A1 | 9/2016 | |
| WO | 2016178494 | A1 | 11/2016 | |
| WO | 2016190720 | A1 | 12/2016 | |
| WO | 2017184648 | A1 | 10/2017 | |
| WO | 2018202768 | A1 | 11/2018 | |
| WO | WO-2021101934 | A1 * | 5/2021 | H04N 21/2381 |

OTHER PUBLICATIONS

U.S. Appl. No. 16/275,078, filed Feb. 13, 2019, Charlemagne Aguilar Santos.
"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC 3.0 Standards", retrieved on Feb. 16, 2018 from https://www.atsc.org/standards/atsc-3-0-standards/.
"ATSC Candidate Standard Revision: Signaling, Delivery, Synchronization, and Error Protection", Doc. S33-1-893r4, Apr. 30, 2018.
"ATSC Standard: ATSC 3.0 Interactive Content (A/344)", May 2, 2019.
"ATSC Standard: ATSC 3.0 Interactive Content", Advanced Television Systems Committee, Dec. 18, 2017.
"ATSC Standard: ATSC 3.0 Security and Service Protection (A/360)", Aug. 20, 2019.
"ATSC Standard: ATSC 3.0 System (A/300)", May 15, 2020.
"ATSC Standard: Signaling, Delivery, Synchronization, and Error Protection (A/331)", Jun. 19, 2019.
"ATSCaster—ROUTE and MMTP server for ATSC 3.0", ENENSYS, Jul. 2018.
"ISO/IEC 23009-5:2017—Information technology—Dynamic adaptive streaming over HTTP (DASH)—Part 5: Server and network assisted DASH (SAND)", May 2017.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.
Agnihotri et al., "ATSC 3.0 Playback Using MPEG Media Transport Protocol (MMTP)", file history of related U.S. Appl. No. 15/925,190, filed Mar. 19, 2018 (201705822.02-1168-922).
I. Bouazizi, "MPEG Media Transport Protocol (MMTP)", Samsung Research America, Mar. 4, 2014.
Kim et al., "Method of DASH segments into a MMTP stream for switching contents under a hybrid broadcasting environment" (2017).
Tanmay Agnihotri, "Advanced Television Systems Committee (ATSC) 3.0 Latency-Free Display of Content Attribute", file history of related U.S. Appl. No. 16/710,746, filed Dec. 11, 2019. (201906112.01-1168-956).
Xu et al., "DASH and MMT and their Applications", (2016).
"Streamline Your Video Delivery: RTMP to HLS Conversion", castr, Jul. 16, 2023, retrieved from https://castr.com/blog/rtmp-to-hls-conversion/.
"HTTP Live Streaming", Wikipedia, retrieved from https://en.wikipedia.org/wiki/HTTP_Live_Streaming.

* cited by examiner

600

#EXTM3U ~610

#EXT-X-VERSION:7 ~620

#EXT-X-MEDIA:TYPE=AUDIO,GROUP-ID="audio",NAME="merge", ~630
DAFAULT=YES,AUTOSELECT=YES,URI="hls_audio.m3u8"

#EXT-X-STREAM-INF:PROGRAM-ID=1,BANDWIDTH=646043,AUDIO="audio" ~640
hls_video.m3u8

FIG. 6

HLS-BASED ATSC 3.0 PLAYBACK USING MMTP DATA

FIELD

This application relates to technical advances necessarily rooted in computer technology and directed to digital television, and more particularly to Advanced Television Systems Committee (ATSC) 3.0.

BACKGROUND

ATSC 3.0 is an Internet Protocol (IP)-based broadcasting standard that provides end-to-end delivery of IP-based content. As recognized herein, ATSC 3.0 supports delivery of files in Dynamic Adaptive Streaming over Hypertext Transfer Protocol (DASH) format and Moving Picture Experts Group (MPEG) media transport protocol (MMTP) format, but not HTTP Live Streaming (HLS) format.

SUMMARY

As further recognized herein, the lack of ATSC 3.0 content delivery in HLS format means that devices equipped with HLS media players cannot play MMTP content as it comes in. Additionally, using either an additional DASH or MMTP media player for media playback in these devices means that multiple media players would otherwise be required absent present principles. But equipping such devices with multiple media players is technically complex and cumbersome.

As also understood herein, the HLS protocol itself cannot be re-used for straight MMTP-based or DASH-based playback. Accordingly, the techniques described herein are provided to facilitate use of a single media player, namely, an HLS media player, for playback of MMTP as received from the broadcaster.

Note that while the description herein uses ATSC 3.0 as an example, it is to be understood that present principles apply to MMTP playback using HLS in general.

Thus, as set forth in detail below, present principles convert MMTP data into HLS protocol for playback. This enables the reuse of an HLS media player for MMTP playback, and enables the media player's processor to be agnostic of the particular protocol being used for transport.

Accordingly, in one aspect a media playback apparatus includes at least one computer memory that is not a transitory signal. The at least one computer memory includes instructions executable by a processor system to receive Moving Picture Experts Group (MPEG) media transport protocol (MMTP) data from a source of content, with the MMTP data indicating media content. The instructions are also executable to use the MMTP data to create one or more HTTP Live Streaming (HLS) files that are usable by an HLS media player to present the media content, and to play the media content using the one or more HLS files and the HLS media player.

In various example implementations, the one or more HLS files may include an HLS text file indicating an HLS audio file and an HLS video file. If desired, the one or more HLS files may include the HLS audio file and the HLS video file themselves.

Also in various examples, the media content may be MP4 content, such as fragmented MP4 media content in particular.

If desired, the media playback apparatus may include the processor system. The processor system may be agnostic of a protocol of media played by the processor system.

Also if desired, the source of content may include an Advanced Television System Committee (ATSC) 3.0 source.

Still further, in certain instances the instructions may be executable to receive the MMTP data through an MMTP delivery channel, and to extract the MMTP data from user datagram protocol (UDP) data received through the delivery channel.

In another aspect, a method includes receiving Moving Picture Experts Group (MPEG) media transport protocol (MMTP) data from a source of content, with the MMTP data indicating media content. The method also includes using the MMTP data to create one or more HTTP Live Streaming (HLS) files that are usable by an HLS media player to present the media content. The method further includes playing the media content using the one or more HLS files and the HLS media player.

In still another aspect, an apparatus includes a processor system and at least one computer storage (e.g., computer readable storage medium) including instructions. The instructions are executable by the processor system to receive Moving Picture Experts Group (MPEG) media transport protocol (MMTP) data from a source of content, with the MMTP data indicating media content. The instructions are also executable to use the MMTP data to create one or more HTTP Live Streaming (HLS) files that are usable by an HLS media player to present the media content. The instructions are further executable to play the media content using the one or more HLS files and the HLS media player.

The details of the present application, both as to its structure and operation, can best be understood in reference to the accompanying drawings, in which like reference numerals refer to like parts, and in which:

BRIEF DESCRIPTION OF THE DRAWINGS

FIG. 6 shows example code of an example HLS text file consistent with present principles;

DETAILED DESCRIPTION

Figure 1:
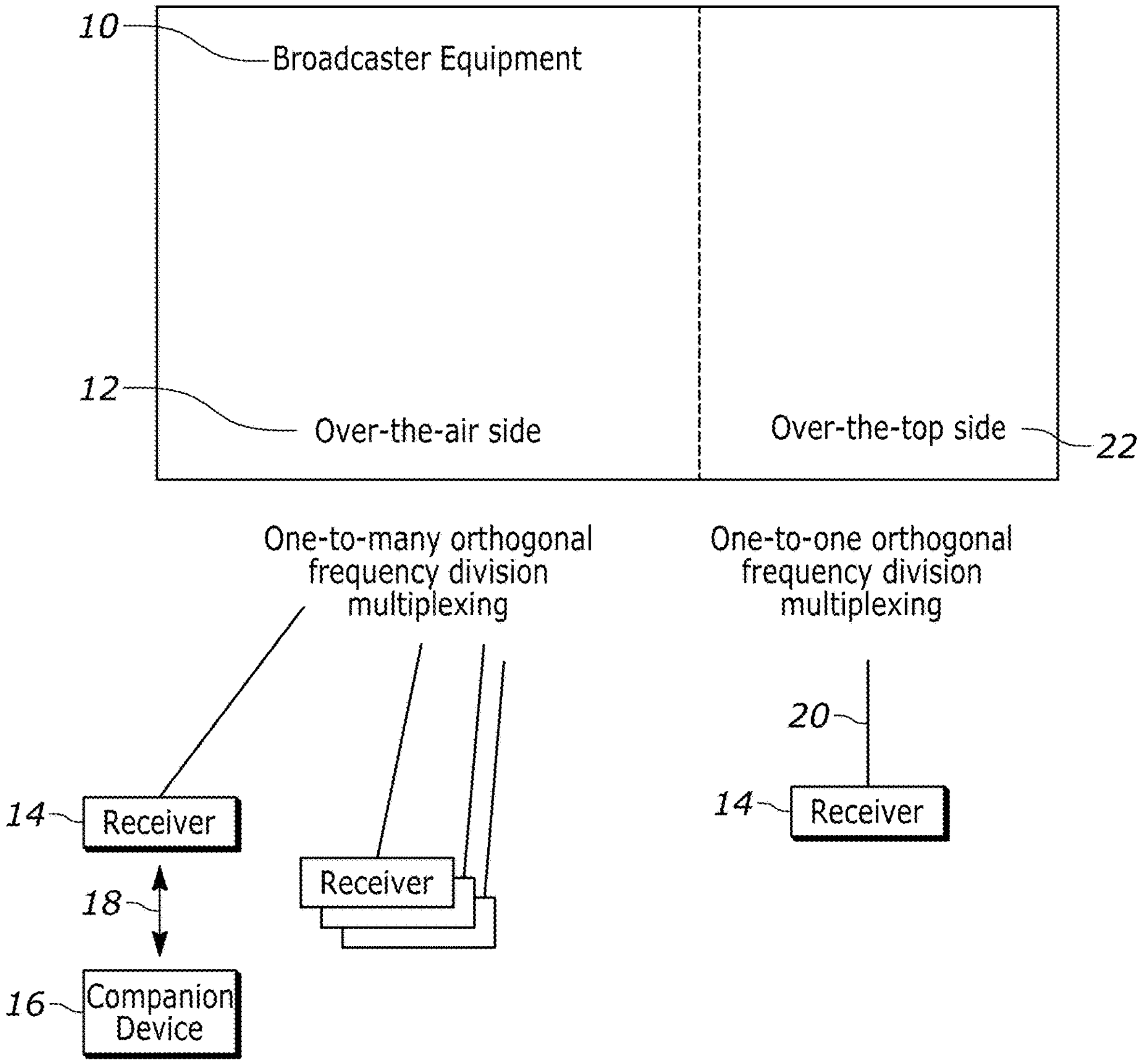
FIG. 1 is a block diagram of an example system including an example in accordance with present principles.

This disclosure incorporates by reference the subject matter disclosed in the specifications of U.S. Pat. Nos. 11,044,294 and 11,606,528.

Principles set forth below describe how to play MMTP or DASH content from an ATSC 3.0 source using iOS devices that do not have DASH or MMTP players installed already.

To do so, a playback apparatus operating consistent with present principles may convert MMT data to the HLS protocol, which enables iOS media players to play the media content without any modifications to the iOS media player itself. The playback apparatus may therefore create separate hls_audio.m3u8, hls_video.m3u8, and hls.m3u8 files. These files can then use fragmented MP4 audio and video files received from an ATSC 3.0 source for media playback.

More generally, this disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits consistent with present principles can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "a" or "an" in reference to an entity refers to one or more of that entity. As such, the terms "a" or "an", "one or more", and "at least one" can be used interchangeably herein.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. A receiver 14 may have both non-persistent memory such as certain types of solid-state RAM and persistent memory such as flash. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
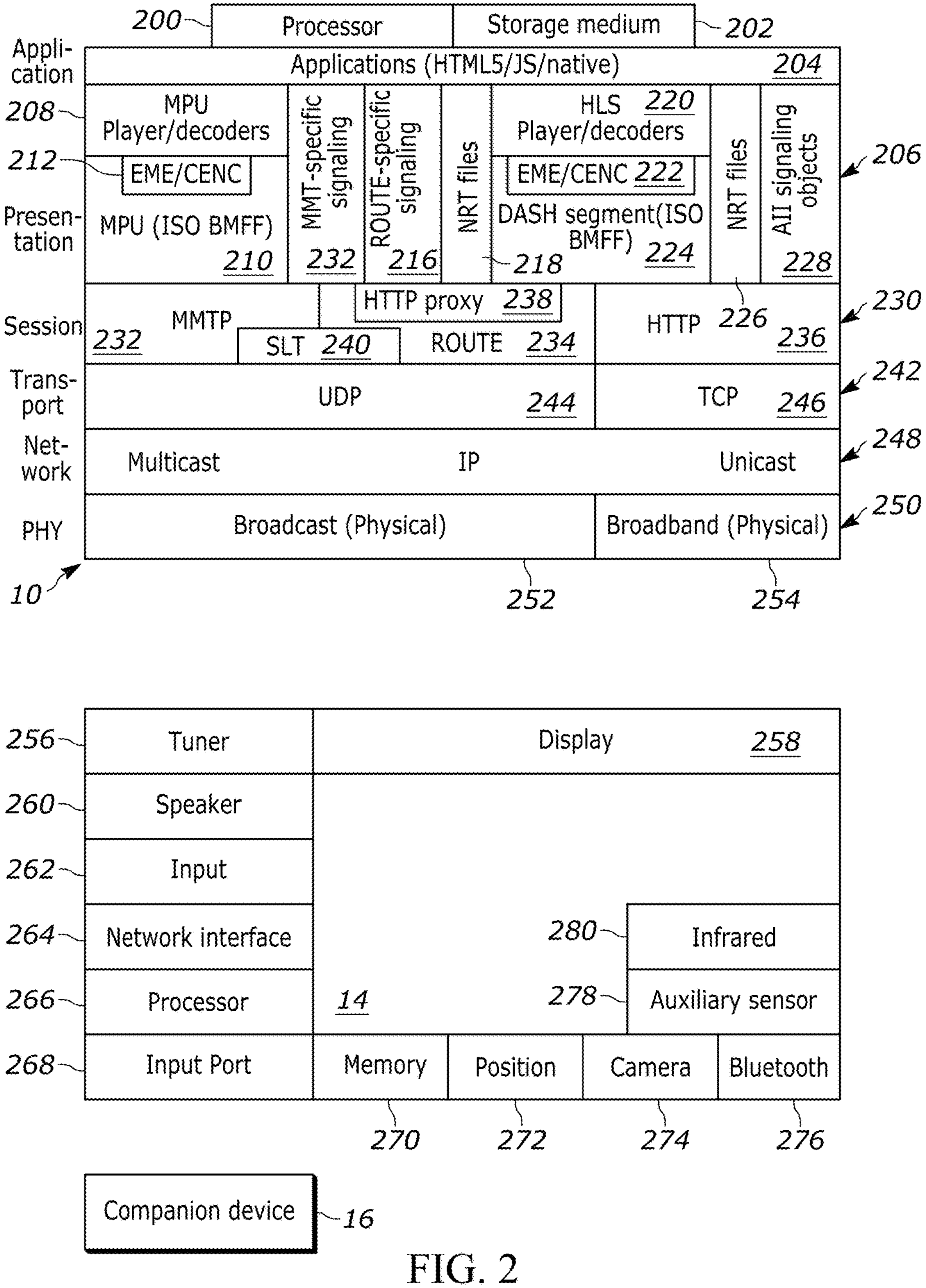
FIG. 2 is a block diagram of a specific example system consistent with present principles.

Referring now to FIG. 2, details of example components shown in FIG. 1 may be seen. FIG. 2 illustrates an example of the broadcaster equipment 10 in terms of a protocol stack that may be implemented by a combination of hardware and software. Using the ATSC 3.0 protocol stack, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to execute one or more software applications in a top level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as media processing units (MPU) 208 that decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including a Motion Picture Experts Group (MPEG) media transport protocol (MMTP) signaling module 214 and a real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, the presentation layer 206 can include one or more HLS player/decoders 220 for decoding and playing audio-video content from the Internet. To this end the HLS player 220 may access a broadband side EME/CENC module 222. The content may be provided as segments 224 in ISO/BMFF format.

As was the case for the broadcast side, the broadband side of the presentation layer 206 may include NRT content in files 226, and may also include signaling objects 228 for providing playback signaling.

Below the presentation layer 206 in the protocol stack is a session layer 230. The session layer 230 includes, on the broadcast side, MMTP protocol 232 and ROUTE protocol 234. MMTP wraps the ISO BMFF files with metadata for broadcast delivery. MMTP may contain pointers to signaling components that identify physical layer pipes (PL), each of which may be thought of as a separate video stream configured for a particular receiver type with source and destination identification information. Other signaling components may be provided to aid in the playback of the audio video content.

On the broadband side the session layer 230 includes HTTP protocol 236 which may be implemented as HTTP-secure (HTTPS). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) may be included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets and/or machine access code (MAC) format packets to be suitable to be transported over the relevant medium, and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH-industry forum (IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
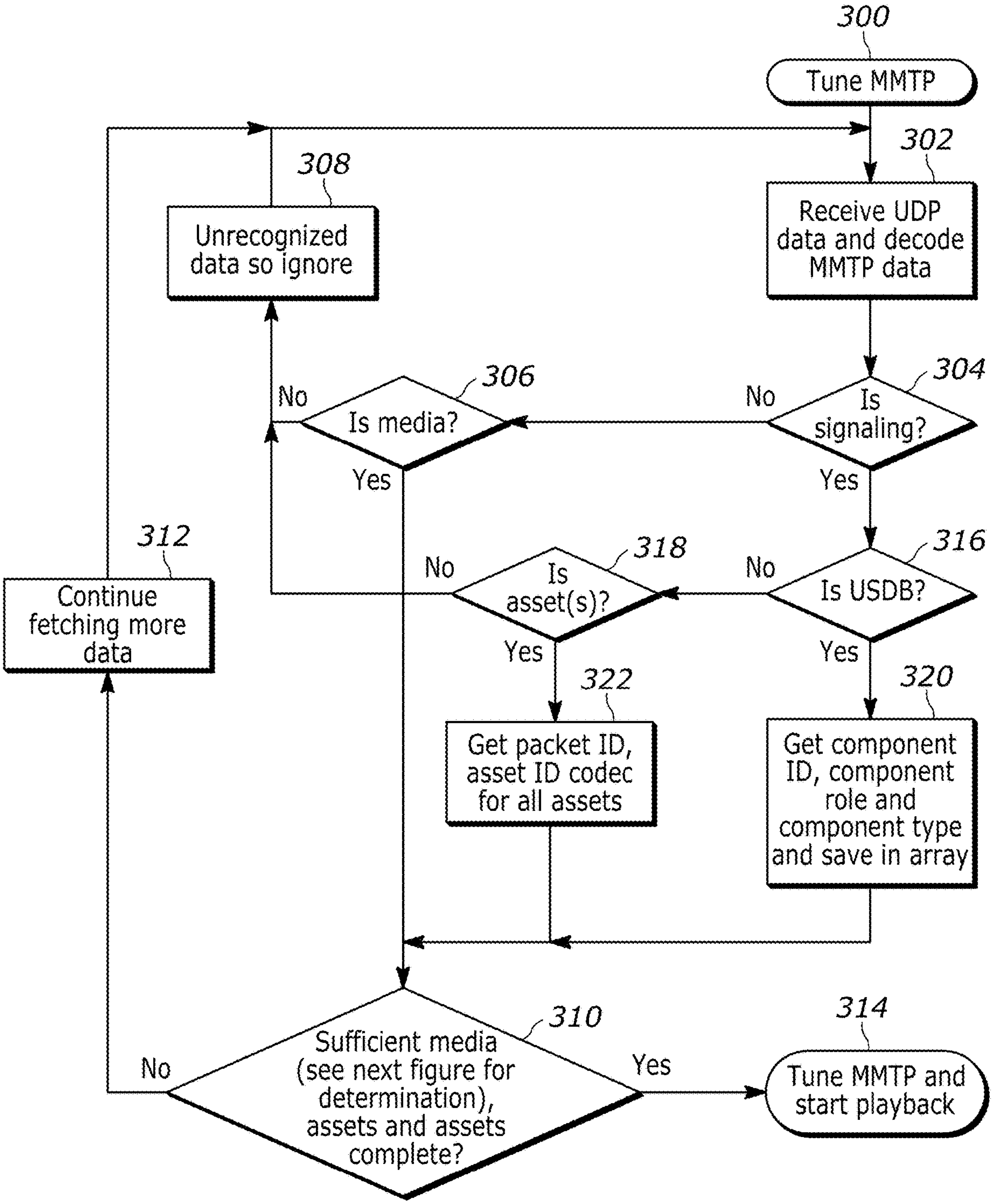
FIG. 3 is a flow chart of example MMTP-to-HLS translation logic consistent with present principles.

FIG. 3 illustrates example logic consistent with present principles that may be employed by, e.g., the media player 204 in FIG. 3. Commencing at block 300, a MMTP delivery channel is tuned to. Proceeding to block 302, user datagram protocol (UDP) data from the tuned-to channel is received and the MMTP data is extracted from the transport layer (UDP messages).

Decision diamond 304 indicates that the type of the extracted data is identified, and if the type of data is not identified by the receiver as signaling data, the logic can move to decision diamond 306 to identify whether the data is media data. Note that signaling data typically provides information for discovery and acquisition of services and related content components, and thus on this basis may be distinguished from the media data itself. If the data is not media, the data is unrecognized at state 308 and ignored, and the process loops back to block 302.

However, if the type of data is media data, the logic stores the media data and moves to decision diamond 310 to determine whether sufficient media along with requisite assets (such as an appropriate codec) has been received to start playback of the media, as discussed further below in reference to FIG. 4. Once requisite assets have been received, HLS files are created based on the information received in the Assets and USDB.

If sufficient media has not been received to start playback, or if the requisite attendant assets to play the media are not found, the logic continues to fetch more data at state 312 by looping back to block 302. On the other hand, when it is determined at decision diamond 310 that sufficient media exists to start playback and that the needed assets are available, the logic moves to block 314 to tune to the MMTP channel and indicate that MMTP acquisition is complete, and to start playback of the media using the HLS player 220 or to indicate as by a message presented on the display of the device that playback may be commenced.

Returning to decision diamond 304, if it is determined that data being received is identified as signaling, the logic may move to decision diamond 316 to identify whether the data is user service description block (USDB) data. If not, the logic may move to decision diamond 318 to determine whether the data indicates an asset that is within a set of known or expected assets. If the data is neither USDB nor an asset the data is unrecognized and so the process loops back to block 302.

However, if the data is recognized at decision diamond 316 as being USDB, the logic moves to block 320 to obtain from the data the component ID, role, and type indicated by the USDB data are identified and saved in a component array. If the data is recognized as asset data at decision diamond 318, the logic moves to block 322 to obtain, from the data, the packet ID, asset ID, and associated codec of the assets identified in diamond 318. These data components are identified and saved. From block 320 or 322 the logic proceeds to decision diamond 310, described above.

If desired, the logic may determine whether the count of all assets equals a predefined or known component array size.

Figure 4:
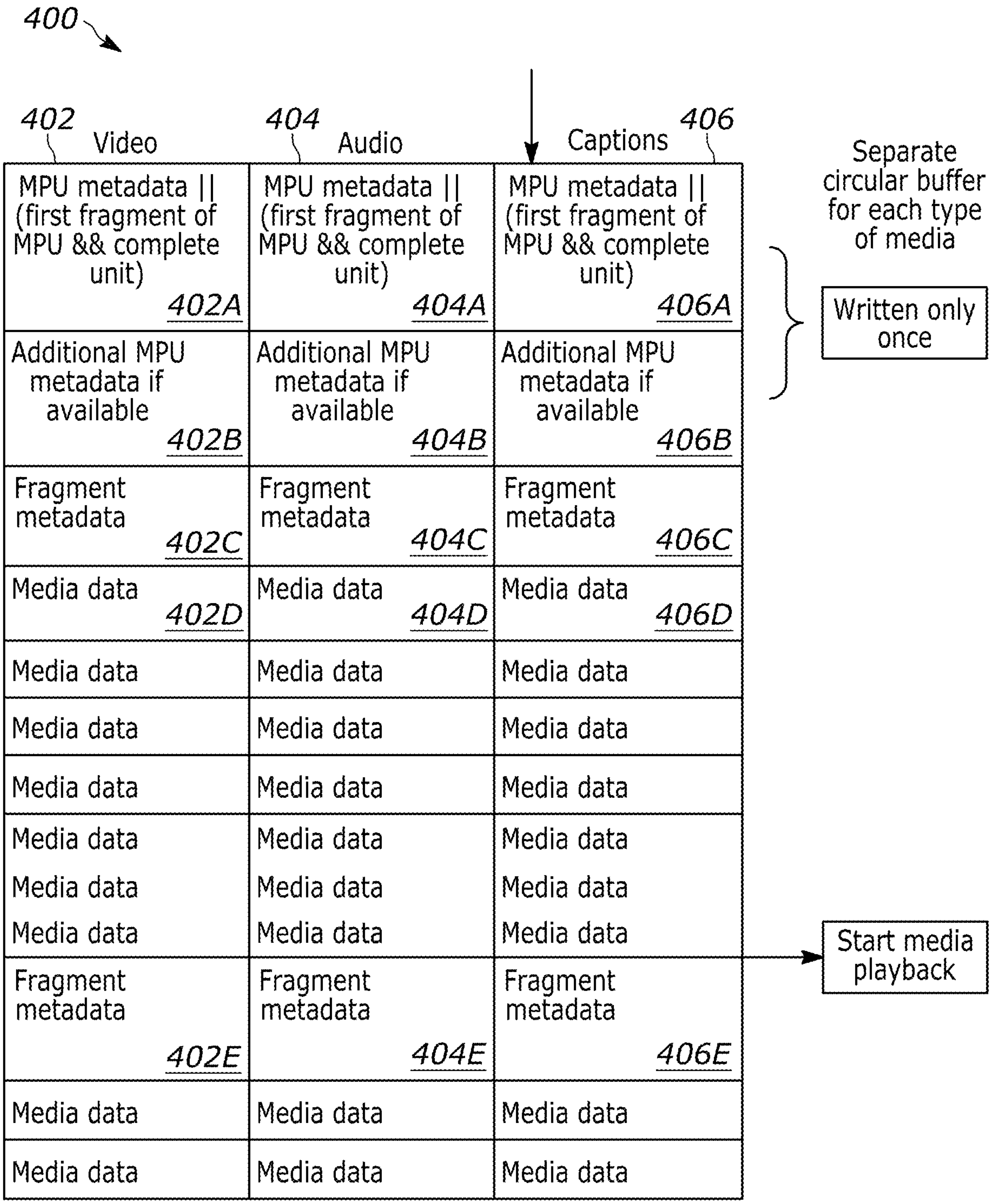
FIG. 4 is a schematic diagram of example data structures implemented as circular buffers for each type of media to be played back (e.g., video, audio, and captions)

FIG. 4 schematically illustrates a data structure 400 in which media data converted from MMTP to HLS may be stored. It is to be understood that accompanying assets such as codecs received in FIG. 3 may be stored and linked to the media data.

Video data may be stored in a video circular buffer represented by the column 402, audio data may be stored in an audio circular buffer represented by the column 404, and caption (text) data may be stored in a caption circular buffer represented by the column 406. Each of the separate circular buffers may contain a respective initial block 402A, 404A, 406A of MPU metadata, including the first fragment of MPU data plus a complete unit of such data, followed by any additional MPU metadata 402B, 404B, 406B if available. This data typically is written only once to the data structure.

Following the metadata, fragment metadata 402C, 404C, and 406C may be provided, following which are blocks 402D, 404D, and 406D of media (video, audio, and caption) in each respective circular buffer). For subsequent fragments in the buffer, fragment metadata 402E, 404E, 406E may be recorded followed by associated media data as shown. Media playback on a fragment-by-fragment basis typically is commenced upon encountering the associated metadata.

With the above in mind, it may now be appreciated that the determination of whether sufficient assets and media exists for playback at decision diamond 308 in FIG. 3 may access the data structure in FIG. 4 to determine wither sufficient media fragments and ensuing media blocks exist to commence playback. In making this determination, a threshold amount of media data may be used to compare with existing stored data exceeds the threshold and if so, a positive determination can be returned at decision diamond 308.

Figure 5:
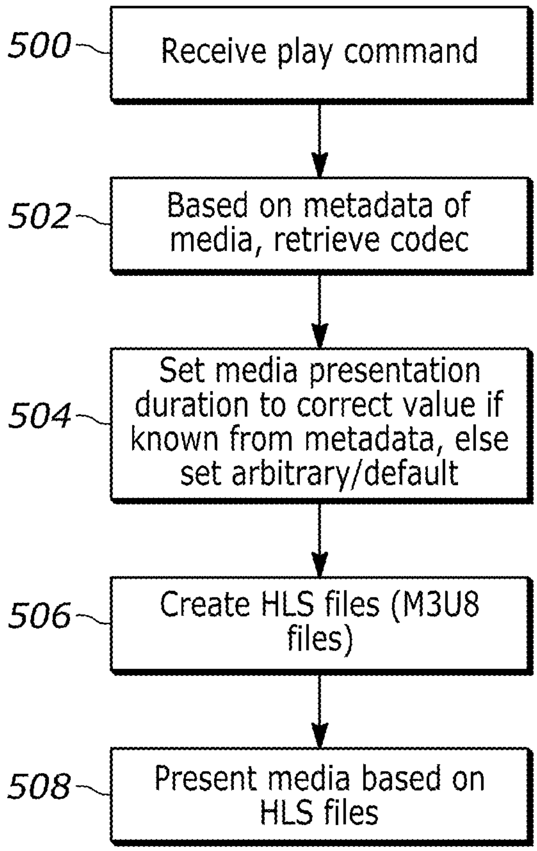
FIG. 5 is a flow chart of example media play logic consistent with present principles.

FIG. 5 illustrates additional example logic. Commencing at block 500, a play command is received, e.g., by a user selecting a play selector or speaking "play". Moving to block 502, the data structure of FIG. 4 may be accessed to retrieve the appropriate codec for the demanded media based on the codec indicated in the associated metadata. Proceeding to block 504, the duration for media presentation may be set to the correct value if known (e.g., from the metadata) or to an arbitrary default period.

After block 504 the logic then proceeds to block 506 where Hypertext Transfer Protocol (HTTP) Live Streaming (HLS) files are created, with it being recognized herein that HLS files are used by Apple® device media players for media playback. Responsive to creating the HLS files at block 506, the logic then proceeds to block 508 where media playback occurs to present the media data using an HLS media player according to the created HLS files.

Describing the creation of the HLS files in more detail per block 506, note that the data populated into the HLS files (e.g., group ID and uniform resource identifier (URI)) may be identified from MMTP media data received from an ATSC 3.0 source via an MMTP delivery channel to which the Apple® device has been tuned. In one particular example, the MMTP media data may be Moving Picture Experts Group (MPEG) MMTP media content such as MP4 media content (e.g., fragmented MP4 content). So, for example, the data populated into the HLS files that are created at block 506 may be data extracted from the transport layer (received UDP messages) from the tuned-to channel consistent with the logic of FIG. 3, and/or metadata of the media per block 502 of FIG. 5 (e.g., asset ID, signaling data, etc.).

Describing the HLS files created at block 506 in even greater detail, reference is now made to FIG. 6. This figure shows the content of an HLS text file 600 in .m3u3 format/file extension. The HLS text file 600 serves as a pointer to HLS video and HLS audio files which are also created at block 506 (also M3U8 files). As shown in FIG. 6, the first line 610 of code indicates that the file is an .m3u8 file. The second line 620 of code indicates the version number for the file format. The next lines of code instruct the HLS media player/Apple® device software on how to initiate playback, with line(s) 630 including a pointer (URI) and playback instructions for an HLS audio file to use, and with line(s) 640 including a pointer (URI) and playback instructions for an HLS video file to use.

Figure 7:
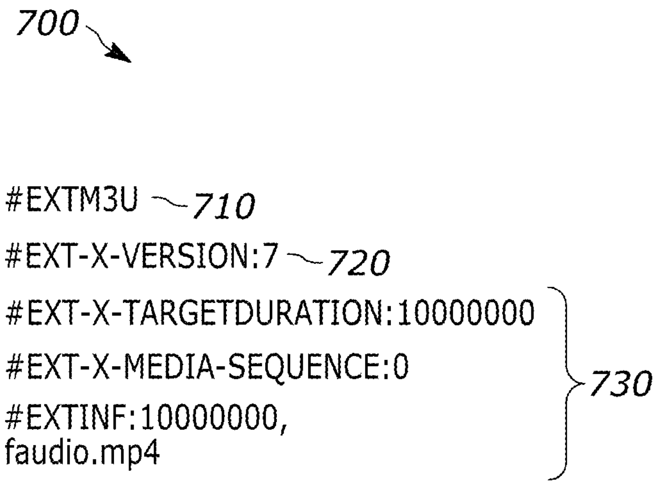
FIG. 7 shows example code of an example HLS audio file consistent with present principles.
Figure 8:
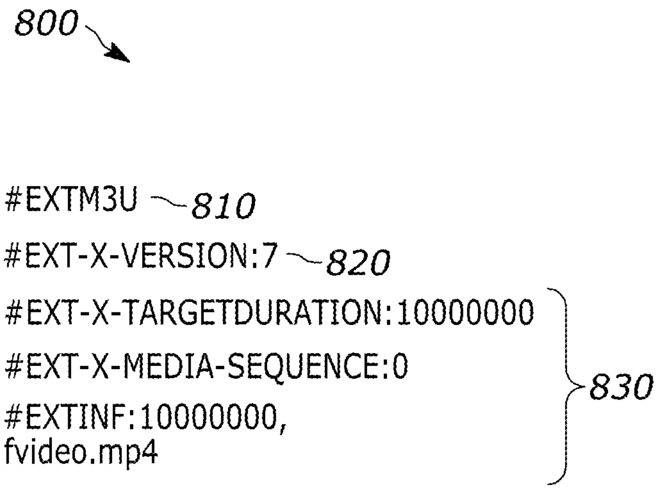
FIG. 8 shows example code of an example HLS video file consistent with present principles.

Thus, the line(s) 630 indicate an HLS audio file to use for playback of MP4 audio associated with the media content, while the line(s) 640 indicate an HLS video file to use for concurrent playback of MP4 video associated with the same overall fragmented MP4 media content. FIG. 7 then shows the HLS audio file 700 also created at block 506 and indicated in the lines 630 of the HLS text file 600, while FIG. 8 shows the HLS video file 800 also created at block 506 and indicated in the lines 640 of the HLS text file 600.

In relation to FIG. 7, note again that the HLS file 700 is in .m3u8 format. Thus, as shown in FIG. 7, the first line 710 of code indicates that the file is an .m3u8 file. The second line 720 of code indicates the version number for the file format. The next lines 730 of code describe playback information about the audio portion of the MP4 media content for use by the HLS media player (e.g., Apple® player).

Now in terms of FIG. 8, note that again that the HLS file 800 is in .m3u8 format. Thus, as shown in FIG. 8, the first line 810 of code indicates that the file is an .m3u8 file. The second line 820 of code indicates the version number for the file format. The next lines 830 of code describe playback information about the video portion of the MP4 media content for use by the HLS media player.

Figure 9:
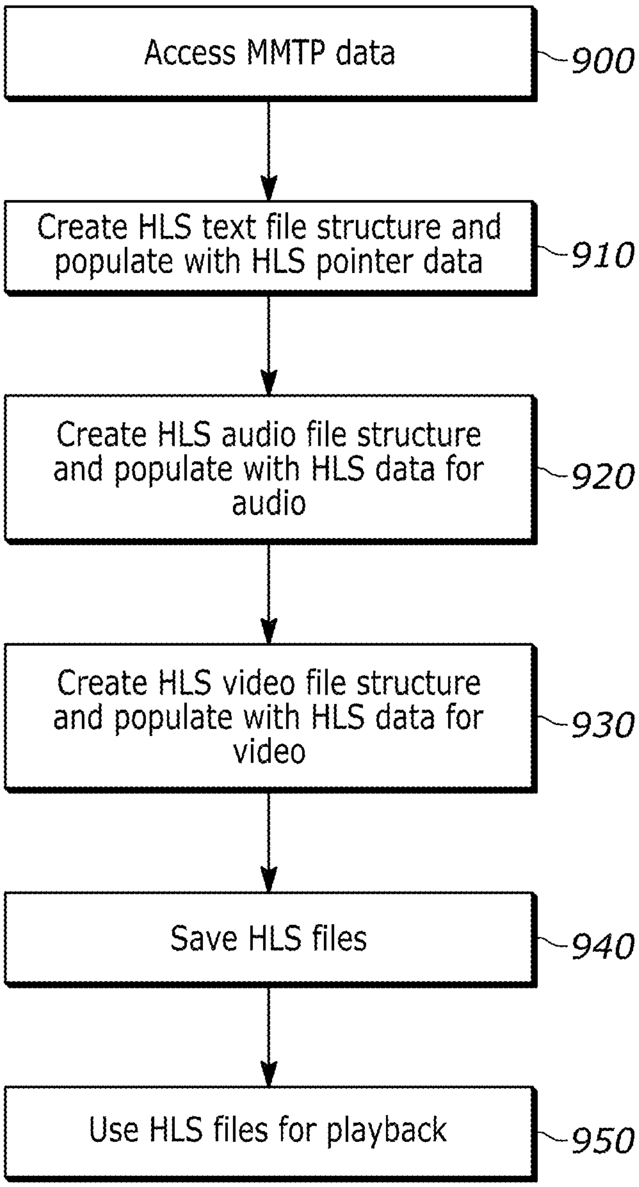
FIG. 9 shows example logic that may be executed to create the HLS text, audio, and video files consistent with present principles.

It may thus be appreciated that the HLS files 600, 700, and 800 may be created from scratch at block 506 of FIG. 5 using the received MMTP data from an ATSC 3.0 content source, with a local receiving device processor system taking data received in the MMTP format and populating it into HLS files in HLS format. The logic of FIG. 9 further illustrates.

Beginning at block 900, MMPT data is accessed according to the description above. The logic then proceeds to block 910 where an HLS text file structure is generated and populated with HLS pointer data per the above to thus create an HLS text file consistent with present principles (e.g., an M3U8 file like the file 600 of FIG. 6). The logic then proceeds to block 920 where an HLS audio file structure is generated and populated with HLS audio data per the above to thus create an HLS audio file consistent with present principles (e.g., an M3U8 file like the file 700 of FIG. 7). The logic then moves to block 930 where an HLS video file structure is generated and populated with HLS video data per the above to thus create an HLS video file consistent with present principles (e.g., an M3U8 file like the file 800 of FIG. 8).

From block 930 the logic then proceeds to block 940. At block 940 the created HLS files may be saved, such as to RAM of the playback apparatus, though the HLS files may also be saved to persistent storage such as a solid state drive or hard disk drive as well. However, present principles recognize that the HLS files may be saved into RAM to cut down on processing time for immediate initiation of playback of the associated MP4 media content itself at block 950, by the HLS media player and using the created HLS files, responsive to the HLS files actually being created.

It may thus be appreciated that MMTP-based media content received over an ATSC 3.0 channel may be used to create HLS files for use with an HLS media player, thus allowing the HLS media player to support MMTP playback. This in turn obviates the technically complex and cumbersome task of creating a new MMTP-based media player for Apple® playback devices, instead enabling the playback of media content received in MMTP using a native HLS media player with which the Apple® device is already equipped.

It will be appreciated that whilst present principals have been described with reference to some example embodiments, these are not intended to be limiting, and that various alternative arrangements may be used to implement the subject matter claimed herein.

What is claimed is:

1. A media playback apparatus, comprising:

at least one computer memory that is not a transitory signal and that comprises instructions executable by a processor system to:

receive Moving Picture Experts Group (MPEG) media transport protocol (MMTP) data from a source of content, the MMTP data indicating media content;

use the MMTP data to create one or more HTTP Live Streaming (HLS) files that are usable by an HLS media player to present the media content;

save the one or more HLS files; and play the media content using the one or more saved HLS files and the HLS media player;

wherein using the MMTP data to create the one or more HLS files comprises:

to create an HLS text file, generating an HLS text file structure and populating the HLS text file structure with first data, the first data comprising a first line of code indicating that the HLS text file is a first M3U8 file, a second line of code indicating a version number for the first M3U8 file, a third line of code indicating a first uniform resource identifier (URI) and first playback instructions for an HLS audio file to use, and a fourth line of code including a second URI and second playback instructions for an HLS video file to use;

to create the HLS audio file, generating an HLS audio file structure and populating the HLS audio file structure with second data, the second data comprising a fifth line of code indicating that the HLS audio file is a second M3U8 file, a sixth line of code indicating a version number for the second M3U8 file, and plural seventh lines of code describing playback information about an audio portion of the media content for use by the HLS media player;

to create the HLS video file, generating an HLS video file structure and populating the HLS video file structure with third data, the third data comprising a eighth line of code indicating that the HLS video file is a third M3U8 file, a ninth line of code indicating a version number for the third M3U8 file, and plural tenth lines of code describing playback information about a video portion of the media content for use by the HLS media player.

2. The media playback apparatus of claim 1, wherein the media content is MP4 content.

3. The media playback apparatus of claim 2, wherein the media content is fragmented MP4 media content.

4. The media playback apparatus of claim 1, comprising the processor system.

5. The media playback apparatus of claim 1, wherein the source of content comprises an Advanced Television System Committee (ATSC) 3.0 source.

6. The media playback apparatus of claim 1, wherein the instructions are executable to:

responsive to creation of the one or more HLS files, initiate playback of the associated media content using the HLS audio and video files.

7. The media playback apparatus of claim 1, wherein the HLS text file, the HLS audio file, and the HLS video file are all different from each other.

8. The media playback apparatus of claim 1, wherein the HLS text file also indicates a group identifier (ID) for the HLS audio file and the HLS video file.

9. A method, comprising:

receiving Moving Picture Experts Group (MPEG) media transport protocol (MMTP) data from a source of content, the MMTP data indicating media content;

using the MMTP data to create one or more HTTP Live Streaming (HLS) files that are usable by an HLS media player to present the media content; and playing the media content using the one or more HLS files and the HLS media player;

wherein using the MMTP data to create the one or more HLS files comprises:

to create an HLS text file, generating an HLS text file structure and populating the HLS text file structure with first data, the first data comprising a first line of code indicating that the HLS text file is a first M3U8 file, a second line of code indicating a version number for the first M3U8 file, a third line of code indicating a first uniform resource identifier (URI) and first playback instructions for an HLS audio file to use, and a fourth line of code including a second URI and second playback instructions for an HLS video file to use;

to create the HLS audio file, generating an HLS audio file structure and populating the HLS audio file structure with second data, the second data comprising a fifth line of code indicating that the HLS audio file is a second M3U8 file, a sixth line of code indicating a version number for the second M3U8 file, and plural seventh lines of code describing playback information about an audio portion of the media content for use by the HLS media player;

to create the HLS video file, generating an HLS video file structure and populating the HLS video file structure with third data, the third data comprising a eighth line of code indicating that the HLS video file is a third M3U8 file, a ninth line of code indicating a version number for the third M3U8 file, and plural tenth lines of code describing playback information about a video portion of the media content for use by the HLS media player.

10. The method of claim 9, wherein the media content is MP4 content.

11. The method of claim 10, wherein the media content is fragmented MP4 media content.

12. The method of claim 9, wherein the source of content comprises an Advanced Television System Committee (ATSC) 3.0 source.

13. The method of claim 9, wherein the HLS text file also indicates a group identifier (ID) for the HLS audio file and the HLS video file.

14. The method of claim 9, comprising:

responsive to creation of the one or more HLS files, initiating playback of the associated media content using the HLS audio and video files.

15. The method of claim 9, wherein the HLS text file, the HLS audio file, and the HLS video file are all different from each other.

16. An apparatus, comprising:

a processor system; and at least one computer storage comprising instructions executable by the processor system to:

receive Moving Picture Experts Group (MPEG) media transport protocol (MMTP) data from a source of content, the MMTP data indicating media content;

use the MMTP data to create one or more HTTP Live Streaming (HLS) files that are usable by an HLS media player to present the media content; and play the media content using the one or more HLS files and the HLS media player;

wherein using the MMTP data to create the one or more HLS files comprises:

to create an HLS text file, generating an HLS text file structure and populating the HLS text file structure with first data, the first data comprising a first line of code indicating that the HLS text file is a first M3U8 file, a second line of code indicating a version number for the first M3U8 file, a third line of code indicating a first uniform resource identifier (URI) and first playback instructions for an HLS audio file to use, and a fourth line of code including a second URI and second playback instructions for an HLS video file to use;

to create the HLS audio file, generating an HLS audio file structure and populating the HLS audio file structure with second data, the second data comprising a fifth line of code indicating that the HLS audio file is a second M3U8 file, a sixth line of code indicating a version number for the second M3U8 file, and plural seventh lines of code describing playback information about an audio portion of the media content for use by the HLS media player;

to create the HLS video file, generating an HLS video file structure and populating the HLS video file structure with third data, the third data comprising a eighth line of code indicating that the HLS video file is a third M3U8 file, a ninth line of code indicating a version number for the third M3U8 file, and plural tenth lines of code describing playback information about a video portion of the media content for use by the HLS media player.

17. The apparatus of claim 16, wherein the source of content comprises an Advanced Television System Committee (ATSC) 3.0 source.

18. The apparatus of claim 16, wherein the HLS text file also indicates a group identifier (ID) for the HLS audio file and the HLS video file.

19. The apparatus of claim 16, wherein the instructions are executable to:

responsive to creation of the one or more HLS files, initiate playback of the associated media content using the HLS audio and video files.

20. The apparatus of claim 16, wherein the HLS text file, the HLS audio file, and the HLS video file are all different from each other.

* * * * *